(No Model.)
T. BONNER.
ALARM DEVICE FOR SCREW MACHINES.
No. 269,627. Patented Dec. 26, 1882.
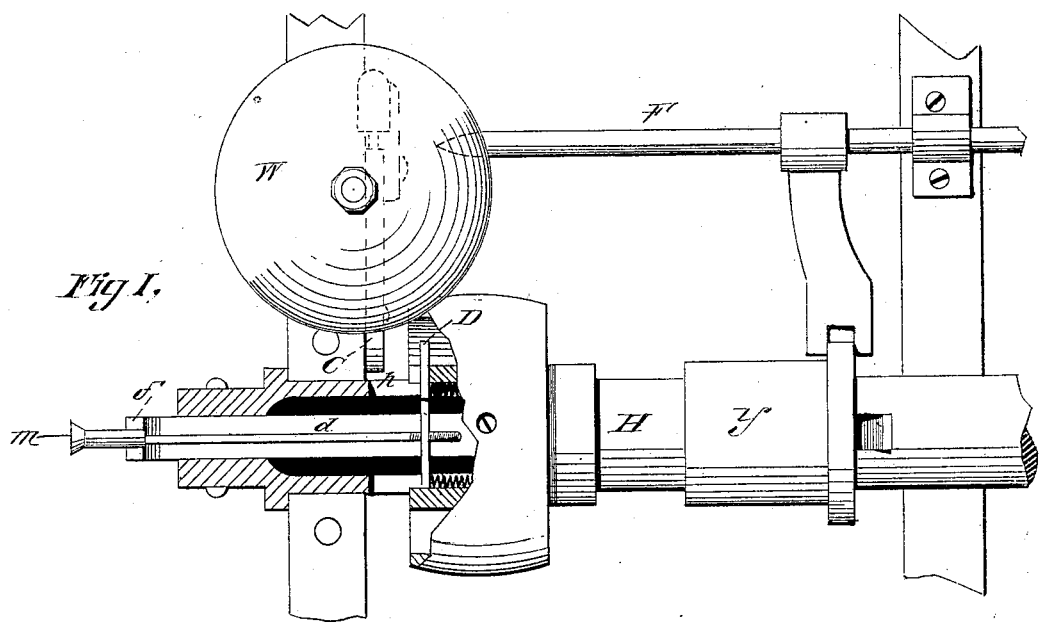
Fig. I.
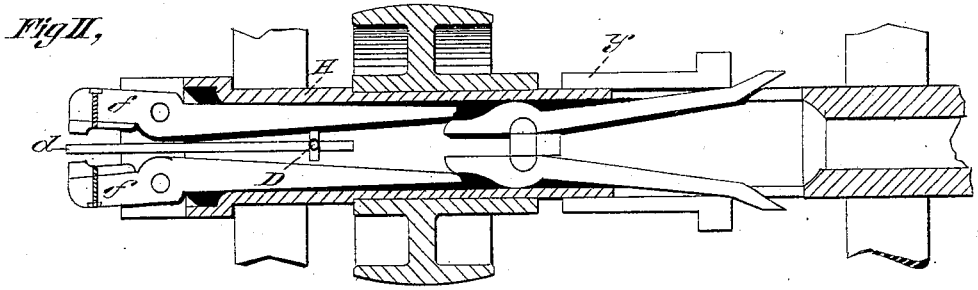
Fig. II.
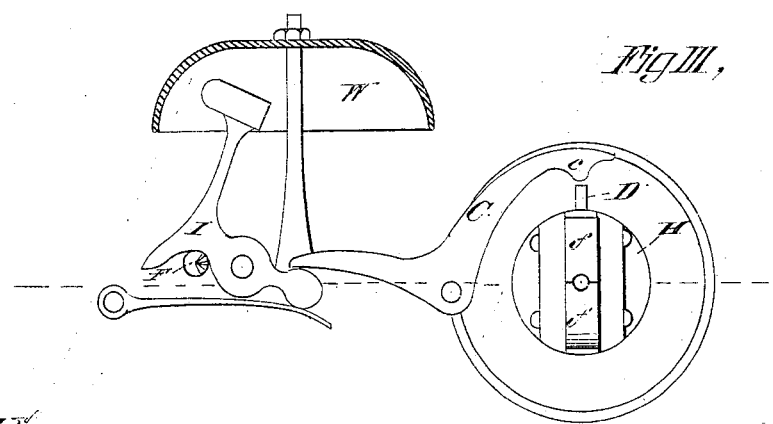
Fig. III.

United States Patent Office.

THOMAS BONNER, OF CHICOPEE, MASSACHUSETTS.

ALARM DEVICE FOR SCREW-MACHINES.

SPECIFICATION forming part of Letters Patent No. 269,627, dated December 26, 1882.

Application filed April 3, 1882. (No model.)

*To all whom it may concern:*

Be it known that I, THOMAS BONNER, a citizen of the United States, residing at Chicopee, in the county of Hampden and State of Massachusetts, have invented new and useful Improvements in Alarm Devices for Screw-Machines, of which the following is a specification.

This invention relates to the combination, with the spindle of a screw-machine for carrying an incomplete screw, of mechanism brought into play by the improper absence of the blank in the chuck of said spindle, to sound an alarm to so indicate the failure of the feed mechanism supplying the chuck to perform its proper function; and it consists generally in a spring projection attached to the spindle, which, by the interposition of the blank, is kept from operative contact with an arm actuating the hammer of a gong, but which, when the chuck of the spindle is empty from a failure of the feed to fill it, permits the spring projection upon each revolution of the spindle to cause a stroke upon the gong; and my invention further consists in the combination, with the gong and spring projection upon the spindle, of a rod connected with the shipper-arm for operating the chuck, and moved with it to prevent the hammer from striking the gong when the chuck is emptied at its regular intervals.

In the drawings, Figure I is a plan view in partial section. Fig. II is a sectional view of a part, and Fig. III is an end view of my invention as applied to the spindle of a screw-machine.

In the drawings, which represent the chuck bearing spindle which holds the screw while its head is being slotted or shaved, the spring-plunger *d*, for throwing out the screw *m* when released by the jaws *ff* of the chuck, is provided with the projection D. The projection D extends to the outside of the spindle H, through the slot *h* in its wall, and moves therein parallel to the axis of the spindle. When held in the position shown in Fig. I by the screw within the chuck, it will, during the revolution of the spindle, clear the hinged arm C. When by the absence of screw *m* the plunger brings the projection D into the position seen in Fig. II it will upon each revolution of the spindle strike the cam end *c* of arm C and rock it to cause the hammer upon spring-lever I to strike the gong W. When the chuck is automatically emptied by the release of its jaws through the movement of the sleeve *y* the rod F, moving in bearings parallel to the spindle, and moving simultaneously with the sleeve *y*, has its pointed end interposed between the striker and the spring, so that though the projection D rocks the arm C no blow is given the gong. When, however, no screw *m* is fed to the chuck from the choking up of the screw-hopper, or from its running out, or from other causes, the projection D, brought into operative position upon the rapidly-revolving spindle, strikes in quick succession blows upon the gong W, whose striker is released by rod F.

The gong W, rocker-arm C, and the striker-arm are all fixed, as seen, upon the frame in convenient distance of the spindle.

When the operative parts of this device are applied to the spindle carrying the incomplete screw in the stage of the blank-rod fed through the spindle itself from the rear, the spring projection is held by the presence within the spindle of the blank-rod from coming in contact with the alarm, to sound it only when the stock or rod runs out, the slight modification required in said arrangement of the projection involving no departure from the spirit of my invention as herein illustrated.

Now, having described my invention, what I claim is—

1. The combination, with the blank-holding spindle of a screw-machine, of a spring-actuated plunger within said spindle, which moves forward when no blank is in the spindle, an arm connected to said plunger and projecting beyond the surface of said spindle, an alarm-bell, and intermediate devices, substantially as described, to cause said bell to be struck when said plunger is moved forward.

2. The combination, with the blank-holding spindle of a screw-machine, of an alarm-bell and striking devices, substantially as described, and of a spring-actuated projection connected with said spindle, to co-operate with said striking devices and cause the bell to be sounded when said spring projection is released by the absence of a blank within the spindle.

3. In a screw-machine, the combination, with projection D, rocker-arm C, and bell W, of rod F, relatively arranged with sleeve $y$, to move with it and prevent the sounding of the alarm at the time of such movement, substantially as shown and described.

THOMAS BONNER.

Witnesses:
R. F. HYDE,
WM. H. CHAPIN.